(12) United States Patent
Albelo (10) Patent No.: US 11,491,578 B2
(45) Date of Patent: *Nov. 8, 2022

(54) HIGH SPEED SOLID STATE MICROMACHINING DEVICE

(71) Applicant: Jeffrey Albelo, Beaverton, OR (US)

(72) Inventor: Jeffrey Albelo, Beaverton, OR (US)

( * ) Notice: Subject to any disclaimer, the term of this patent is extended or adjusted under 35 U.S.C. 154(b) by 385 days.

This patent is subject to a terminal disclaimer.

(21) Appl. No.: 16/796,187

(22) Filed: Feb. 20, 2020

(65) Prior Publication Data

US 2020/0189031 A1    Jun. 18, 2020

Related U.S. Application Data

(63) Continuation-in-part of application No. 16/697,142, filed on Nov. 26, 2019, now Pat. No. 11,353,727, and a continuation-in-part of application No. 16/441,867, filed on Jun. 14, 2019, now Pat. No. 11,422,430, which is a continuation-in-part of application No. 15/421,701, filed on Feb. 1, 2017, now Pat. No. 10,386,489.

(51) Int. Cl.

| B23K 26/082 | (2014.01) |
|---|---|
| B23K 26/00 | (2014.01) |
| B23K 26/70 | (2014.01) |
| B23K 26/08 | (2014.01) |
| B23K 26/06 | (2014.01) |

(52) U.S. Cl.
CPC .......... *B23K 26/082* (2015.10); *B23K 26/009* (2013.01); *B23K 26/0648* (2013.01); *B23K 26/083* (2013.01); *B23K 26/702* (2015.10)

(58) Field of Classification Search
CPC .... G02F 1/29; G02F 2202/36; G02F 2203/24; G02F 1/015; G02F 1/0151; G02F 1/017; G02F 1/01725; B23K 26/362; H01S 3/0071; G01S 17/89; G01S 7/4817; G01S 7/4811; G01S 7/4818; G01S 17/931; G05D 1/0236
See application file for complete search history.

(56) References Cited

U.S. PATENT DOCUMENTS

| 5,291,034 | A * | 3/1994 | Allam | G02F 1/3556 |
| | | | | 257/17 |
| 10,386,489 | B2* | 8/2019 | Albelo | G01S 17/42 |
| 2014/0094954 | A1* | 4/2014 | Griffiths | B23K 26/36 |
| | | | | 700/166 |
| 2014/0110384 | A1* | 4/2014 | Kleinert | B23K 26/352 |
| | | | | 219/121.68 |
| 2018/0356342 | A1* | 12/2018 | Laycock | G02B 26/06 |

* cited by examiner

*Primary Examiner* — Luke D Ratcliffe
(74) *Attorney, Agent, or Firm* — Mark S Hubert (57) ABSTRACT

A micromachining device that utilizes a solid state laser beam scanner to steer and scan laser beams onto a moveable stage. There are no moving parts as in the galvometric scanner devices in current use. The laser beam scanner has two components, a variable frequency signal generator that is electrically connected to at least one substantially transparent and partially conductive substrate plate (hereinafter plate) with a generally planar face thereon that has a series of quantum dots (of an arbitrary size but narrow size distribution) affixed with the plate, where each of the quantum dots possess an inducible dipole moment, and each of the quantum dots are in electrical contact with the plate, where the quantum dots undergo an excitation and successive recombination (or relaxation) by the input of magnetic, optical or electrical signals.

11 Claims, 9 Drawing Sheets

HIGH SPEED SOLID STATE MICROMACHINING DEVICE

PRIORITY

This application is a continuation-in-part of U.S. Utility application Ser. No. 16/441,867 filed Jun. 14, 2019 which is a continuation-in-part of U.S. Utility application Ser. No. 15/421,701 filed Feb. 1, 2017 (now U.S. patent Ser. No. 10/386,489 issued Aug. 20, 2019). This application is also a continuation-in-part of U.S. Utility application Ser. No. 16/697,142 filed Nov. 26, 2019. This application incorporates by reference all of the patent applications it claims priority from.

FIELD

The present disclosure relates, in general, to equipment for high speed laser micromachining as is commonly used for the creation of consumer electronics, printed circuit boards, medical, aerospace and microfluidic devices and the like.

BACKGROUND

Laser micromachining is a common technique for the fabrication or drilling, shaping or etching of minutely dimensioned parts. Commonly, these are a series of through orifices or similar subtractive features placed within relatively small and precise dimensions relative to one other or within precise locations on the substrate or part being machined. Since these parts are commonly processed in bulk and with numerous features per part, speed is of the utmost importance.

Generally, the parts are put onto an X-Y or X-Y-Z stage (a moving platform) that have their directional motion motors (or linear or air bearing motors) driven by a controller (microprocessor or other logic device) beneath a laser beam that is steered by a galvonometer scanner that, with another signal from the same controller, quickly adjusts the angles of the steering mirrors that the laser's beam is reflected, thus projecting it onto its desired location of machining with a high degree of accuracy and precision. The controller also synchronizes the power, timing and duration of the laser pulses that are steered by the galvanometer scanner to affect micromachining at the desired location set by the set of software instructions in the machining application of the controller responsible for operating the system in coordinated and perhaps also in coordinated compound motion commonly practiced in the art.

The drawbacks of this type of micromachining device lie in the performance of the galvanometer scanner. As a moving mass, it is prone to mirror vibration, shaft breakage, mechanical wear, backlash in the mirror movements, and inertial compensation time loss and positional uncertainty experienced at the positions of the shaft where peak acceleration occurs during directional changes. All of these drawbacks contribute to slower, less precise micromachining and ultimately place limits on the size and precision of the dimensions of the resultant product that is bored, shaped machined, textured or etched into its final configuration. Presently, the limit of the speed of laser beam scanning in such micromachining devices is between five and 50 meters per second, with some polygon scanner capable of 100 meters per second, but with a necessary accuracy and precision penalty directly proportional to the liner speed at which the scanners are operated.

Thus, a micromachining device able to increase the precision and speed over the existing state of the art micromachining devices with low failure rate, would fulfill a long felt need in this industry. This new invention utilizes and combines known and new technologies in a unique and novel configuration to overcome the aforementioned problems and accomplish the desired performance improvement.

BRIEF SUMMARY

In accordance with various embodiments, a solid state, non-moving laser beam scanner is used to replace the conventional galvanometer scanners for the steering of laser beams in a micromachining device, which could be a stand-alone unit or an operational component of a larger automated system, as is common in the industry. Using such a device built as disclosed herein would provide the capability of increased linear scanning speeds. This improvement would encompass both large steering angles and drive signal frequencies up to 100 GHz resulting in laser beam motion equivalent to hundreds of meters per second not subject to limitations caused by accelerations in traditional systems.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF CERTAIN EMBODIMENTS

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. Well-known methods, procedures, components and circuits have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the following description, for the purposes of explanation, numerous specific details are set forth in order to provide a thorough understanding of the described embodiments. It will be apparent to one skilled in the art, however, that other embodiments of the present invention may be practiced without some of these specific details. It should be appreciated that the features described with respect to one embodiment may be incorporated with other embodiments as well. By the same token, however, no single feature or features of any described embodiment should be considered essential to every embodiment of the invention, as other embodiments of the invention may omit such features.

The term "series of quantum dots" or "quantum dots" or as used herein refers to a grouping of elements including molecules, atoms, molecular clusters, ions, agglomerated particles, Nano clusters, individual Nano particles, and carbon Nano tubes, whether having an inducible or permanent dipole moment, or not that can be electrically addressed for use in creating a modulator of electromagnetic signals, where in the present case said modulation includes steering the incident beam through a pre-determined angle.

As used herein the term "arbitrary size" refers to a grouping of all possible sizes as used with respect to "particles" present in the devices described herein. The sizes can be of any range, but the optimal results occur when the particles are distributed over a narrow size distribution (i.e. dispersion), typically less than 200 nm.

As used herein the term "partially conductive substrate plate" refers to a grouping of all possible substrate materials that are by nature or can be rendered to become conductive to electrical, thermal, magnetic or optical signals over some portion of their volume or surface, for use in affecting the local electronic environment within, on, or next to the substrate plate and also those of any other materials in contact with said plate.

As used herein, the term "signal" refers to both the plural and singular form of the word. i.e. signal and signals and refers to any electromagnetic wave or particle generated within, on, in, in the vicinity of, or near the modulator.

As used herein the term "substantially transparent" means capable of passing more than 2% of the incident radiation.

As used herein the term "partially conductive" with respect to the substrate plate, means capable of sending or receiving a signal through, from or over a metallic, dielectric or semiconducting material, which could comprise any of a number of materials, including, but not limited to, glass, polymers, gels, ceramics, organic molecules, carbon in any form, crystalline or amorphous materials or mixtures, layers or stacks thereof.

As used herein the term "inducible dipole moment" refers to any number of charges that can be placed into, on, through or near any "quantum dot" resulting in a user controllable change in the polarizability and/or permeability of the quantum dot, local environment or dielectric substrate after the receipt of an external signal containing the charge or triggering its release and this term especially refers to the carriers of said charge or charges prior to recombination or radiation.

As used herein the term "permanent dipole moment" refers to a dipole or charge that persists without any external control input.

As used herein, the term "dipole" refers to any electrical point or area charge localized on, in or near a quantum dot in the modulator.

As used herein, the term "control unit" is any controllable variable frequency electromagnetic signal generator that generates and provides a controllable variable frequency electromagnetic signal to the substrate plate assembly to excite the quantum dots. (This may be an RF signal, and IR signal, an optical signal or any suitable electromagnetic signal.) Herein the control unit is incorporated into or coupled to the controller.

As used herein, the term "controller" is a microprocessor configured to provide drive signals to the linear motors of a multi-axis positioning stage, receive positional feedback from the linear scale encoders of the multi-axis positioning stage, provide pulse timing and trigger signals to the laser, and laser beam steering control signal to the control unit all based on the specific set of machining instructions input to the machining application installed into the microprocessor's memory.

As used herein, the term "optically coupled" or "optical coupling" refers to a method of transmitting electromagnetic signals with wavelengths between 50 nanometers and 100, 000 nanometers. This is generally accomplished by impingement of either direct or reflected electromagnetic signals onto the substrate plate assembly. An example would be of the aiming of a laser light beam from the output of the control unit to the input of the substrate plate assembly. Another example would be an array of LEDS illuminating the substrate assembly in order to affect the desired quantum dot excitations.

As used herein, the term "scanner" refers to a device that can steer the laser beam in both a point to point jumping mode as well as provide and direct the laser beam in a continuous path between points. Steering refers to the ability to point the laser beam sequentially at different points.

As used herein, the term "stage" refers to a platform that may be moved in the X-Y or X-Y-Z planes by a set of directional motion motors (or linear motors) driven by a controller. The stages can be presented in either stacked or split architectures and in the case of the Z axis, very frequently driven by a voice coil.

Unless otherwise indicated, all numbers herein used to express quantities, dimensions, and so forth, should be understood as being modified in all instances by the term "about." In this application, the use of the singular includes the plural unless specifically stated otherwise and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The present invention relates to a high speed, solid state micromachining device, however since micromachining devices are well known, the novelty herein lies in the incorporation of a solid-state laser beam scanner for directing the laser beam onto the target. It does not need moveable mirrors with their inherent problems and speed limitations (of approximately 5 meters/second).

Figure 1:
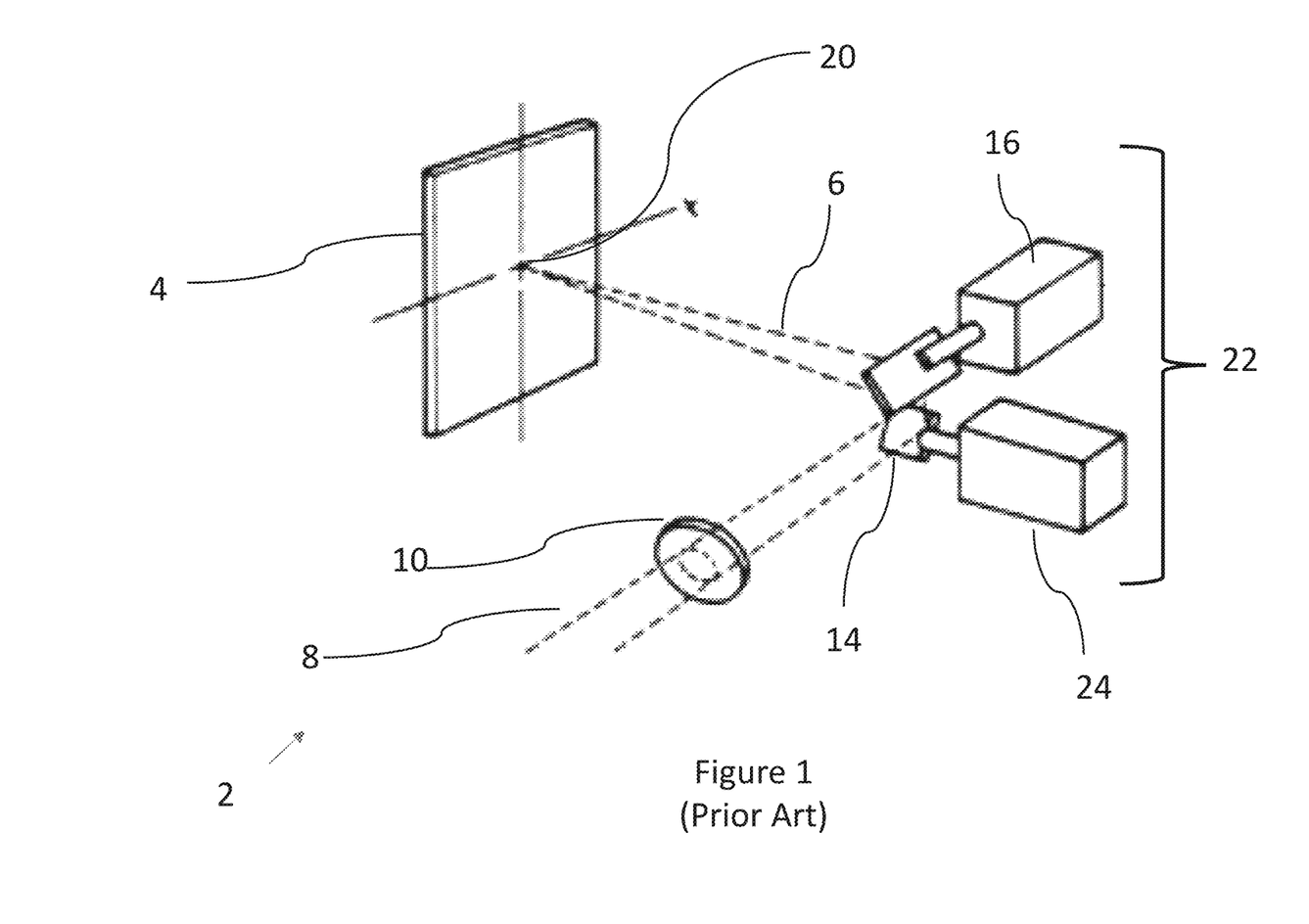
FIG. 1 is a representative view of the prior art galvanometer scanner for a laser micromachining device, steering an incoming laser beam onto a part.

Looking at FIG. 1 it can be seen that a conventional prior art laser micromachining device 2 has an X-Y or X-Y-Z stage (moving platform) 4 that has directional motion motors (or linear movers) driven by a controller (microprocessor) so as to precisely position a point on the part affixed to the stage 4 beneath a scanned laser beam 6. This scanned laser beam 6 is a laser beam 8 that that has passed through a focusing lens 10 onto at a galvanometer scanner 22 that with another signal from the same controller, quickly adjusts the angles of its mirror 14 that reflect the laser beam, thus projecting it as a scanned laser beam 6 onto its desired location of machining on the part. In this illustration, there is an X galvanometer scanner 24 and a Y galvanometer scanner 16 scanning the laser beam 8 onto the midpoint 20 of the stage 4. The controller also synchronizes the power, timing and duration of the laser pulses that are steered by the galvanometer scanner to affect micromachining of the specific location contained in the software instructions in the operating application of the controller.

Figure 2:
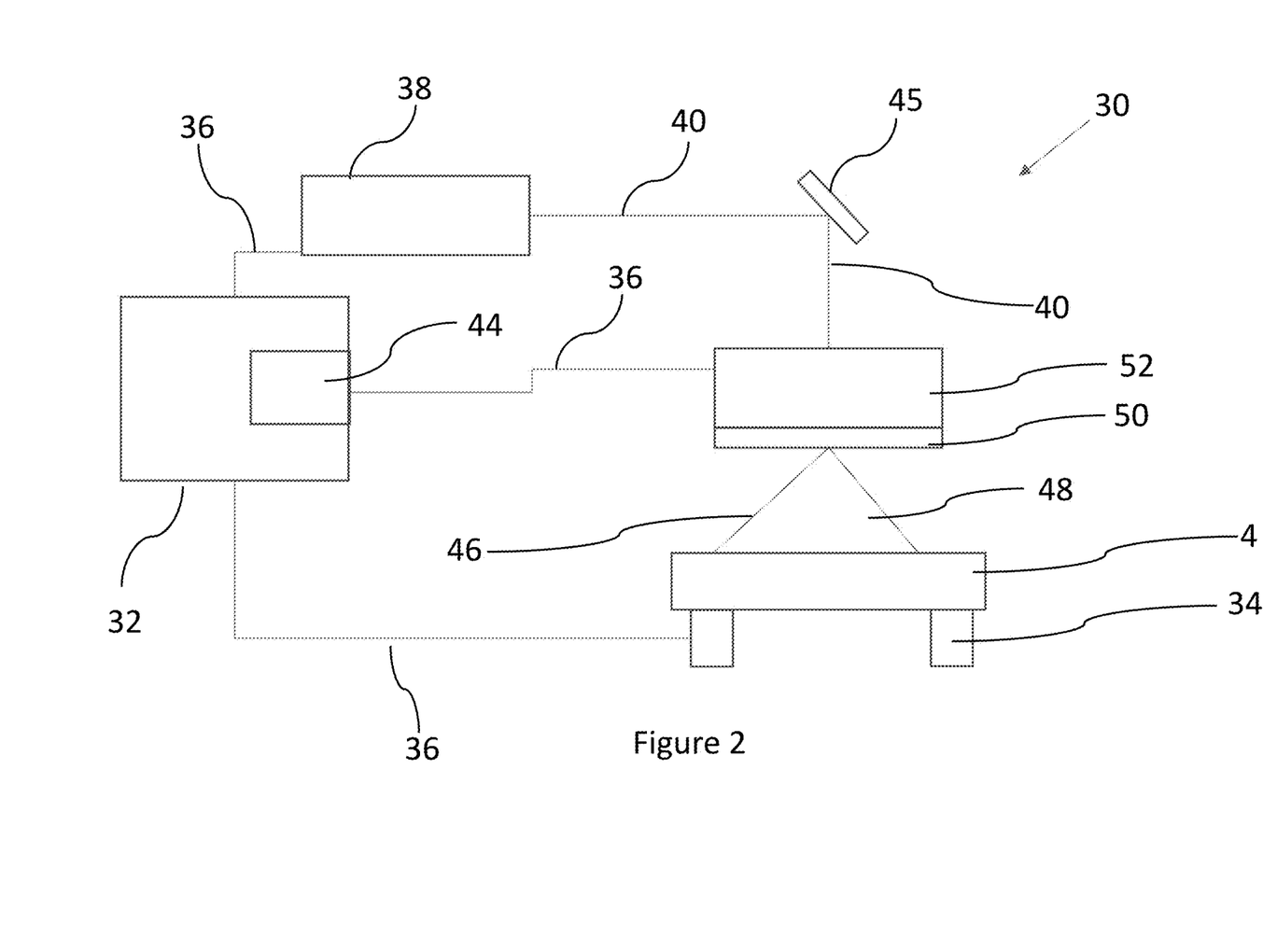
FIG. 2 is representative view of a solid-state laser beam scanner incorporated into a laser micromachining device in operation, steering an incoming laser beam onto a part.

In contrast, FIG. 2 shows the high speed, solid state micromachining device 30. It has a controller 32 operatively connected (generally, by hard wiring 36) to the directional motion motors 34 that are connected to and move the stage 4. Incorporated into these linear motors 34 are positional sensors providing positional feedback to the controller 32 which is continually compared to the desired position of the model of the part that is in the software application of the controller 32 so as to continually correct the drive signals to the directional drive motors 34. The controller 32 is also operatively connected 36 to a laser 38 to provide drive signals to operate the laser 38 sending a laser beam 40 into substrate plate assembly 52 of the solid-state scanner 42 (FIG. 3) either directly or via reflection from at least one optional steering mirror 45. The solid-state scanner 42 is operationally connected 36 to a control unit 44, and as directed by the controller 32, the control unit 44 generates and sends the appropriate electric signal (or optical signal) to the substrate plate assembly 52 of the solid-state laser beam scanner 42 (as described further herein.) This electrical signal that enters the substrate plate assembly 52 alters the electromagnetic environment of the quantum dots in the quantum dot array to change the polarizability such that an incident laser beam will undergo deflection (modulation) through the substrate plate assembly 52 of the laser beam scanner 42, so as to convert the laser beam 40 into a scanned laser beam 46 having a directional change corresponding to a predetermined angle indicated somewhere in the area of the cone 48. The scanned laser beam 46 then strikes the stage 4 (or more precisely the work piece mounted on said stage 4) at the desired location. It is the controller 32 that tells the control unit 44 where it wants the scanned laser beam to be positioned based on the set of specific instructions programed into the machining application in the controller 32. The power supplies for each of the components are not illustrated as they are well known in the industry. An optional focusing lens 50 (single or compound) may be positioned after the solid-state scanner 42 to affect any number of optical characteristics imparted to the scanned beam, all of which are well-known in the industry.

Figure 3:
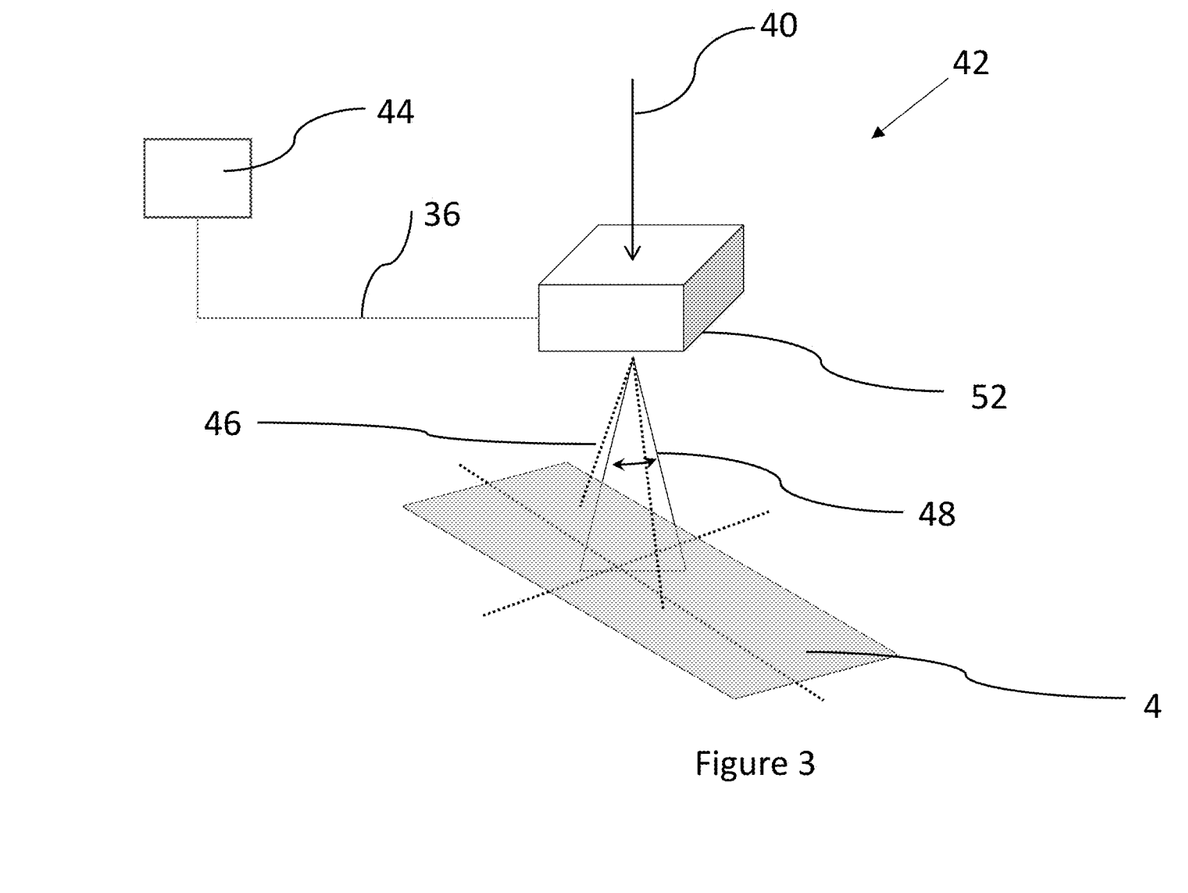
FIG. 3 is a representative view of the preferred embodiment solid state laser beam scanner illustrated as a stand-alone component.

FIG. 3 is a simplified representative drawing of the solid-state laser beam scanner 42 with its control unit 44 operatively coupled by hard wire 36 to the substrate plate assembly 52. The scanning accomplished of the laser beam 40 can be seen in the scanned laser beams 46 sent out within the angles indicated by the cone 48.

Figure 4:
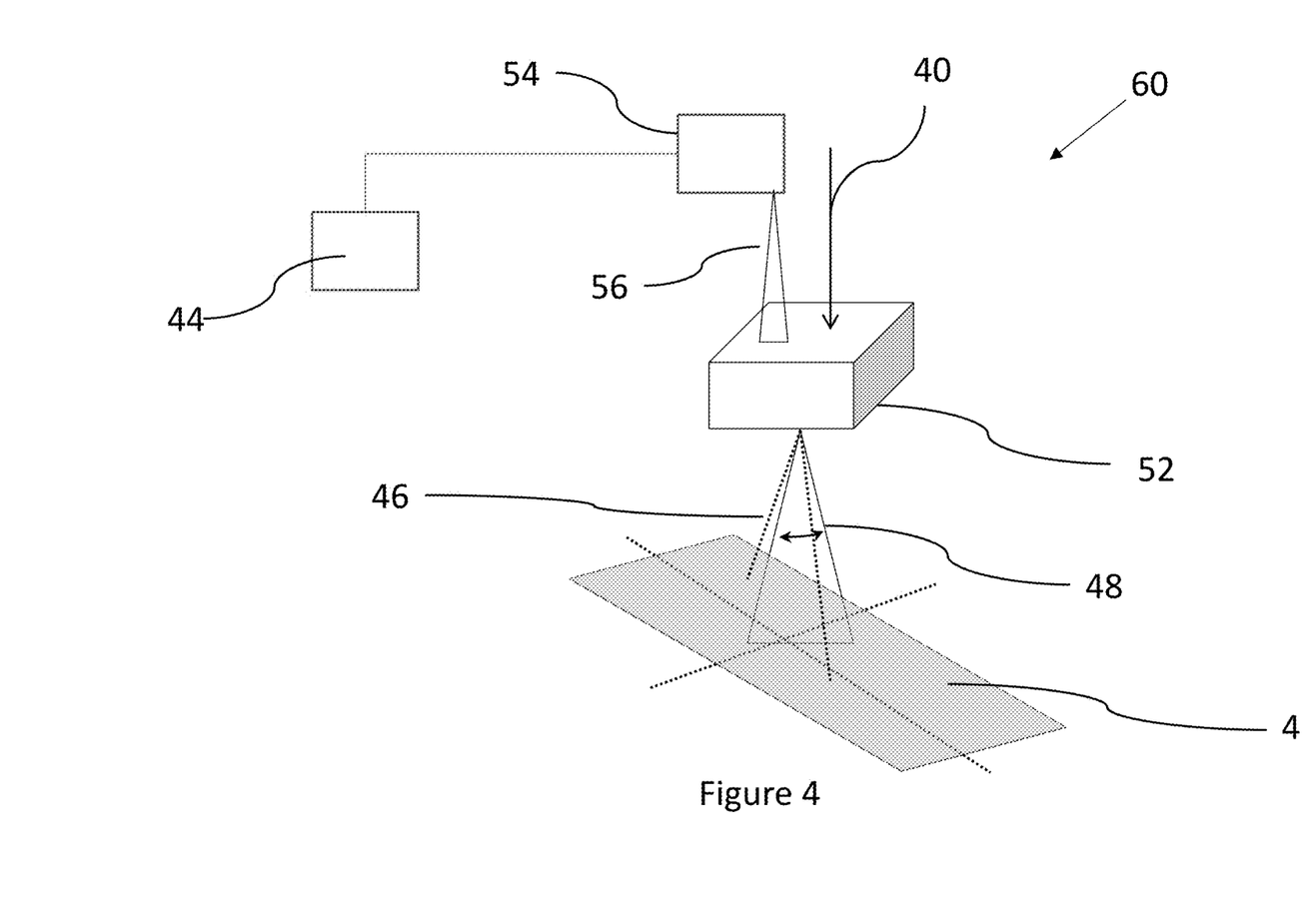
FIG. 4 is a representative view of an alternate embodiment solid state laser beam scanner utilizing an optical signal rather than an electrical signal to control the substrate plate assembly.

FIG. 4 shows an alternate embodiment solid state laser beam scanner 60 that differs from the preferred embodiment solid state laser beam scanner 42 only in that its control unit 44 sends an optical signal 56 generated by an optical source 54 onto the substrate plate assembly 52 that alters the electrical environment in the quantum dots of the quantum dot array to change to polarizability such that an incident laser beam will undergo deflection, so as to converts the laser beam 40 into a scanned laser beam 46 having a directional change to land on the correct location on the stage 4. Note, that the control unit 44 is not directly physically connected to the substrate plate assembly 52, but could be if a fiber were used to convey the optical control signal.

Since micromachining devices and systems have been known for quite some time in the industry, there is no need discussing the details of operation of the stage 4, the laser 38, the controller 32, the machining application or the set of operating instructions loaded into or imbedded within the controller's microprocessor. Rather, this disclosure focuses on the structure, construction and operation of the laser beam scanner 42.

The preferred embodiment laser beam scanner 42 is made of a control unit 44 operationally coupled to at least one substantially transparent and partially conductive substrate plate (hereinafter plate) with a generally planar face thereon that has a series of quantum dots (of an arbitrary size but narrow size distribution) affixed with the plate, where each of the quantum dots possess an inducible dipole moment, and each of the quantum dots are in electrical contact with the plate, where the quantum dots undergo an excitation and successive recombination (or relaxation) by the input of magnetic, optical or electrical signals. The recombination time is modulated by the spatial and electronic environment of the quantum dots within each layer of the device (i.e. between the plates), which can be different or the same, from plate to plate or layer to layer in the case of a multiplate device. This excitation and recombination cause a change to polarizability such that an incident laser beam will undergo deflection and a directional change.

Figure 5:
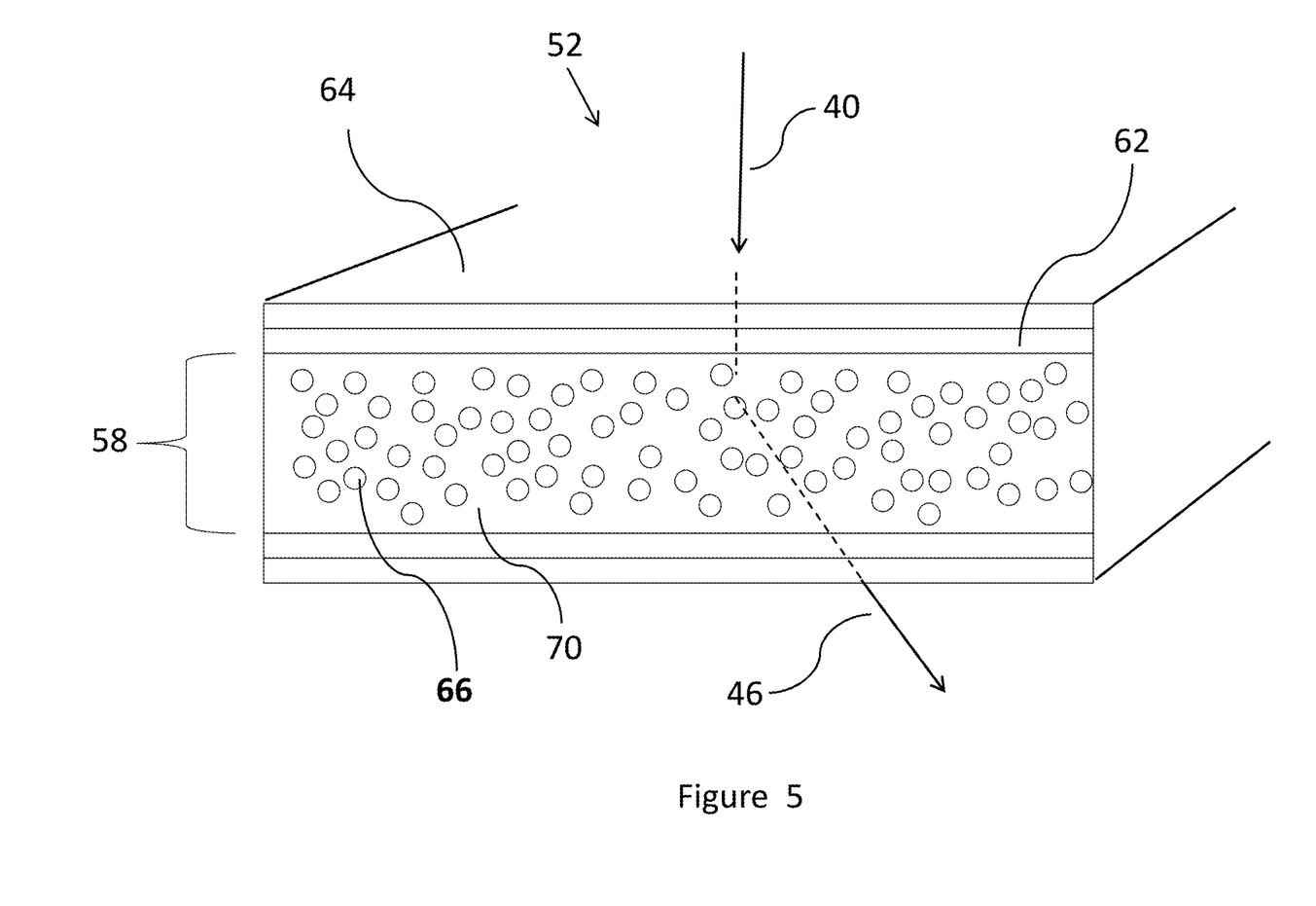
FIG. 5 is a cross-sectional view of multi-layer substrate plate assembly with the central layer expanded for clarity and explanation purposes.

FIG. 5 shows a cross-sectional view of multi-layer substrate plate assembly 52 with the central layer 58 expanded for clarity and explanation purposes Here, it can be seen that the substrate plate assembly 52 comprises at least one planar, substantially transparent and partially conductive substrate plate 62 having at least one generally planar face 64 thereon, having a series of quantum dots 66 (of an arbitrary size but narrow size distribution) affixed with the plate 62, where each of the quantum dots 66 possess an inducible dipole moment, and each of the quantum dots 66 are in electrical contact with the plate 62, where the quantum dots 66 undergo an excitation and successive recombination (or relaxation) by the input of magnetic, optical or electrical signals to the substrate plate assembly 52 from the control unit 44. (Shown in FIG. 2)

The electrical contact between the quantum dots 66 and the substrate plate 62 may be affected using a transparent conductive oxide grid, a set of conductive finger lines, vertical conductive vias and/or by using a conductive or semiconductive material selection for the plate.

Figure 6:
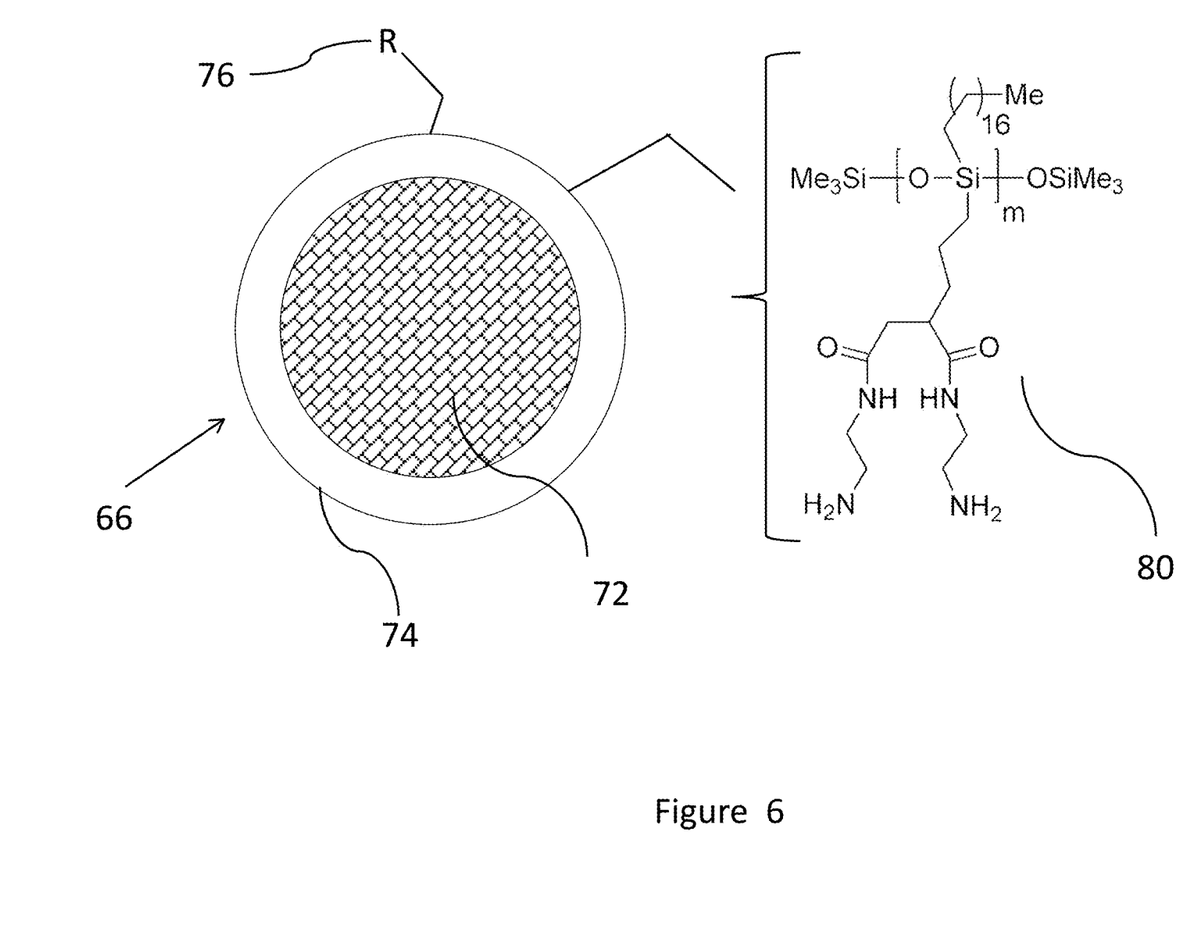
FIG. 6 is a representative view of a quantum dot.

FIG. 6 is a quantum dot. The quantum dot 66 has a core comprising a suitable nanocrustal material, chosen by considering the desired bandgap and operational characteristics of the material 72 upon which is grown a shell 74 of nano crystals. This shell 74 is usually grown onto the core 72 to a uniform thickness after the core has been formed. This shell 74 has a different band gap than the material of the core 72. The shell 74 is selected from the group of compound semiconductors comprising but not limited to InP, CdS, ZnSe, GaAs, InGaP, any II-VI, III-V, I-VII compound semiconductor, as well as those of doped intrinsic semiconductors such as Si. Bonded to the shell 74 are ligands 76 that aid in the spacing and arrangement of the quantum dots 66. The ligands also impart electrical characteristics to the quantum dots 66 and create a permeable dielectric barrier between neighboring quantum dots 66. Ligands are organic molecules that are chemically bonded to the shell 74. The ligands 76 are additionally utilized to confer user selected switching behavior (modulation behavior) that affect the electromagnetic signal modulator's refractive index range (from + to −). Chemical compound 80 is but an example of a commonly used ligand 76 with quantum dots 66. More generally, Ligands are organic compounds of variable chemical functionality containing as many as 50 or as few as 3 carbon atoms, typically arranged in linear or branched linear chains. These groups are typically given the generic designation R in accordance with chemical naming conventions (as shown in FIG. 6, element 80). R, R', R" is typically used to convey groups of different chemical identity and functionality.

These changes in the electromagnetic environment of the substrate plate assembly 52 that scans or steers the laser beam, are optimized adjusting four factors in addition to simply modifying the incoming control signal: the size of the quantum dot, the character of the ligands on the quantum dot (ligand chemistry), the ratio of the core to shell diameter of the quantum dot, and the spacing between adjacent substantially transparent and partially conductive substrate plates. The adjustments in the electromagnetic environment that change the permittivity and permeability of the quantum dots may be affected by alteration of any one, or a combination of the aforementioned factors.

By tuning these four parameters, the user can tailor make a tunable laser beam scanner with customized operating frequencies, which enables operation of the laser beam scanner in modes that are ideally suited to the particular deflections needed for the beam steering and machining of certain geometry targets. One such customizable feature is the frequency at which the recombination rate experiences resonant behavior under electrical or optical or magnetic excitation. This enables the laser beam scanner to exhibit wave front steering by rapidly switching between refractive index state differences ($\Delta n$) as large as two to three. Of particular note, are those frequencies of the drive signal whereby the laser bean scanner exhibits a negative refractive index. This is both novel and critically important behavior for a laser beam scanner in that the S/N ratio will increase by at least an order of magnitude, and the overall performance will be nearly loss-less (relative to transmission efficiency).

Uniformity of spacing between parallel, adjacent plates is ensured by using sets of identically sized dielectric spacers. In the preferred embodiment these are glass spheres. Changing the plate spacing alters the electric field strength that the quantum dots experience as drive signals of variable frequency are applied from a control unit. Excitation of the quantum dots occurs primarily by promotion of an electron from the valence band to the conduction band. After the quantum dots experience this excitation, a number of mechanisms exist for the relaxation or recombination of the electron with the quantum dot. By way of example, Auger scattering is a reasonably efficient mechanism for recombination/relaxation that is observed in the so-called intra-dot regime and being so efficient occurs at a relatively fast rate of less than 10 picoseconds. Because of this short relaxation timing, the modulation of an incident electromagnetic wavefront can be accomplished by drive signals from the control unit at frequencies of up to and potentially in excess of 100 GHz. This results in an improvement in existing laser beam scanners by as much as 2 orders of magnitude. This enables highly efficient and very fast raster scanning and also unprecedented point-to-point scanning. Bigger spacing between the plates decreases the electric field between them where the quantum dots are, slowing down the excitation rate of the quantum dots. This allows for fine tuning of resonant frequencies within the electromagnetic modulator. Having control over the resonant frequencies gives the ability to change the index of refraction over a fairly wide range and even create a device where the index of refraction can be negative.

Increasing and decreasing the spacing between adjacent plates will have a linear inverse effect on the observed electric field between the plates as measured from the point of view of the quantum dots. This can act as a means for fine-tuning the switching frequency by altering the rate at which the quantum dots are being excited and thus the rate at which free carriers are generated.

Further altering the size of the quantum dots will enable one to fine-tune the effective mass of the electrons in the quantum dots. This is important because the switching rate of the device is inversely proportional to the dot size. This is observable spectroscopically by virtue of smaller dots producing longer relaxation periods due to an increase in the effective mass and the subsequent decrease in carrier mobility.

Utilizing quantum dots where a dipole can be induced creates the last piece of the puzzle, since the effective refractive index is driven by the polarizability and magnetic permeability of the quantum dot system. Altering these quantities by judicious choice of the above parameters, enables highly customizable switches, beam scanners, multiplexers, and generalized EM modulation across a wide range of fields and application.

The laser bean scanner 42 is made of a substrate plate assembly 52 and control unit 44. Referring again to FIG. 5, the substrate plate assembly 52 of the laser beam scanner 42 (electrically connected via hard wire to the control unit 44 providing a non-optical (electrical) drive signal to the substrate plate assembly 4 so as to affect the modulation (here the steering) of the incident laser beam 40 into the modulated electromagnetic wavefront (scanned laser beam) 46. With the application of a different electromagnetic drive signal from the control unit 44 to the substrate plate assembly 52, the steering angle of the incident laser beam 40 can be further modulated as represented by the further modulated wavefront indicted by dashed lines 46.

Figure 10:
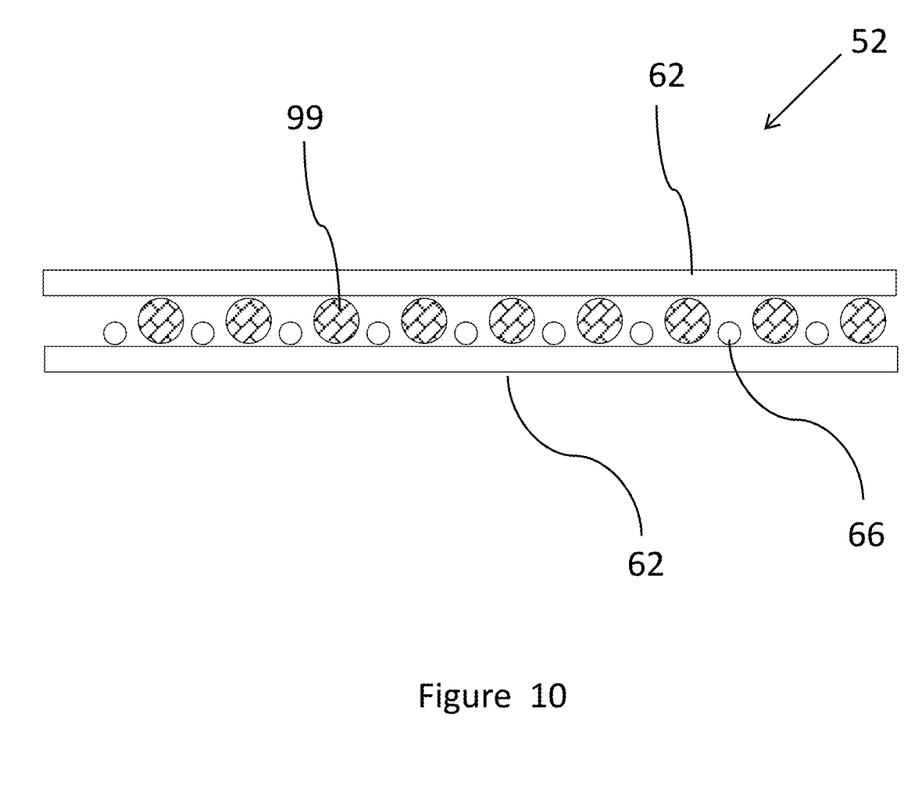
FIG. 10 is a cross sectional view of a substrate plate assembly 52 with glass spacers.

FIG. 10 illustrates one construct of how the variable spacing of adjacent, parallel substrate plates 62 in a multiple substrate plate assembly 52 may be accomplished. The view has been expanded vertically to show the arrangement of quantum dots 66 and spherical glass spacers 99 between the adjacent, parallel substrate plates 62. The spacers 99 must be at least the diameter of the quantum dots 66, and made of a dielectric material, all the same size, but may range in dimension up to 5 mm in diameter. By changing the spacing (the diameter of the spacers) the resonant field characteristics can be varied, according to user requirements as dictated by the application. This will affect the switching speed, steering angle, linear or non-linear response characteristics, and dynamic range (e.g. signal to noise ratio).

Figure 7:
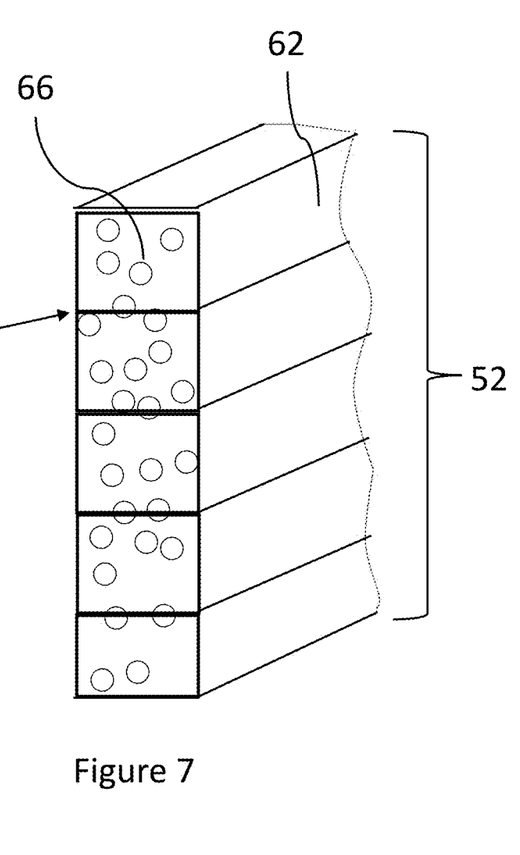
FIG. 7 is a representative view of the multi-layer substrate plate assembly arranged in a vertical configuration.

FIG. 7 is a representative view of a multi substrate plate assembly 52 depicted in a vertical configuration. Here the individual substantially transparent and partially conducting substrate plates 62 can be seen in stacked a parallel arrangement with the quantum dots 66 therebetween and or thereon the plates 62. For visual clarity the spacers 99 and ligands 76 have been removed. The unnumbered arrow between FIGS. 7 and 8 represent from where in FIG. 7 the horizontal cross section is taken.

Figure 8:
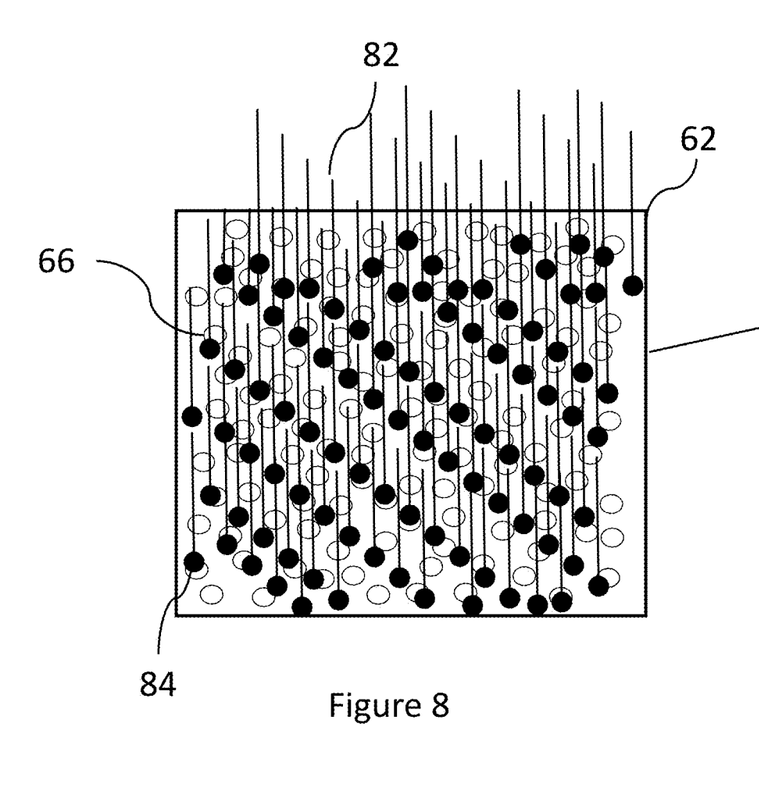
FIG. 8 is a horizontal cross-sectional view of the multi plate assembly of FIG. 7.

FIG. 8 shows a horizontal cross-sectional view of the multi plate assembly 52 of FIG. 7 taken at the interface of two plates 62 as indicated by the aforementioned arrow. It illustrates the three-dimensional nature of the substrate plate assembly 52 and an embodiment of electrical contact between the quantum dots 66 and a substrate plate 62 at the top face 64 of a substrate plate 16. Quantum dots 66 are distributed on the surface of least one substrate plate 62 within the volume of the substrate plate assembly 52. The stack of substrate plates in the substrate plate assembly 52 are electrically connected by conductive traces 82 and metal vias 84 to operationally connect the substrate plate assembly 52 to the control unit 44 (in the case of an electric signal).

Figure 9:
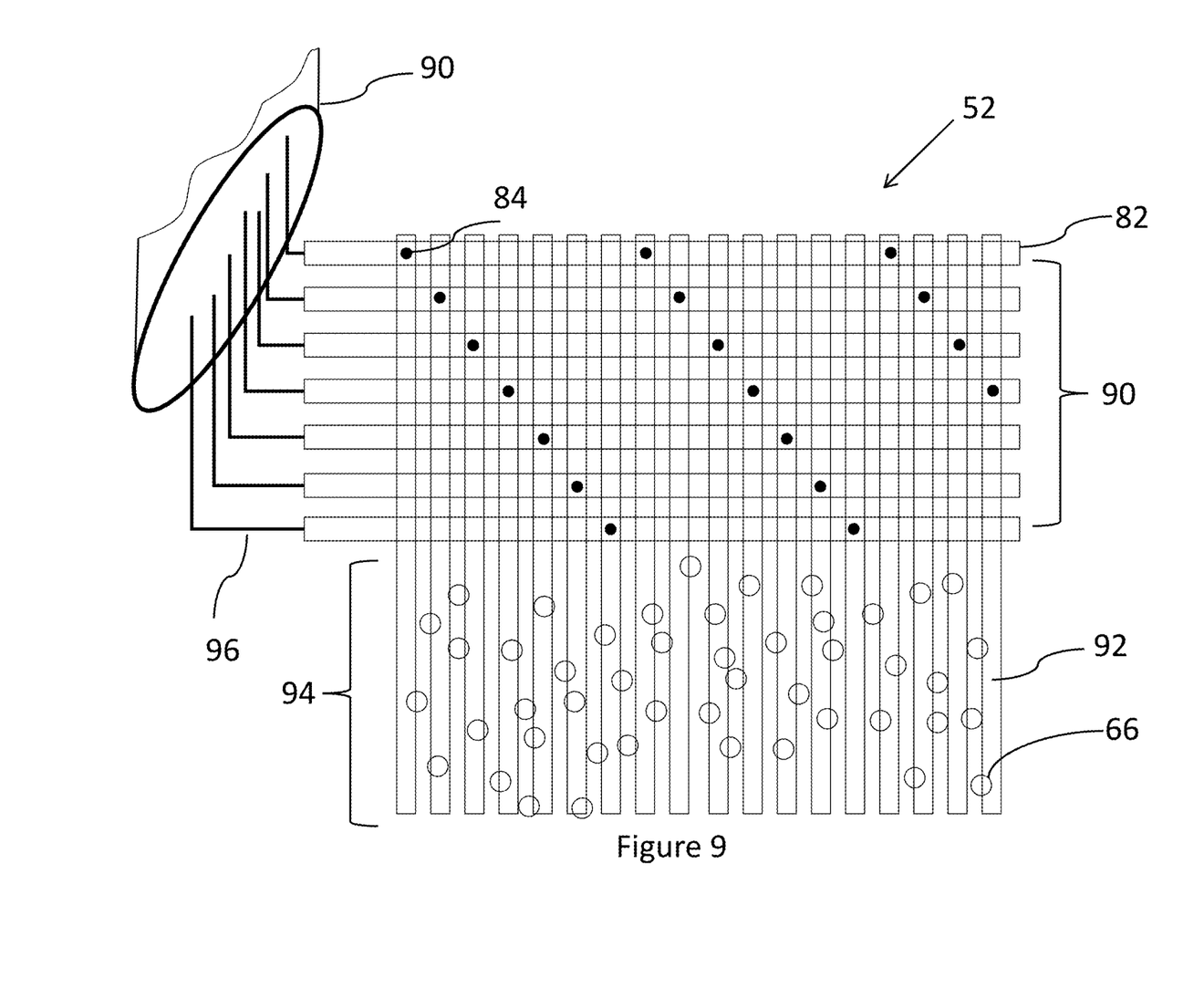
FIG. 9 is an expanded view of the signal conduction architecture of a substrate plate assembly in the laser beam scanner.

FIG. 9 is an exploded view of a section of the multi plate assembly 52 showing the interconnect scheme of conductive traces 82 on one layer of the multi plate assembly 52 (as taken at the top face of a substrate plate) via its conductive traces 82 and metal vias 84. It can be seen that the wire bundle 90 or the hard wire direct operative connection 36 to the control unit 44, is a bundle of smaller conductors 96 connected to the interconnect header 90 comprising individual metallic traces 82 providing electrical contact through metalized conductive vias 84 to the transparent conductive pathways 92 on the glass, comprising the active portion 94 of the multi plate assembly 52 of the laser beam scanner 42 to which the quantum dots 66 have been applied.

The fabrication of the laser beam scanner 42 is accomplished in the following manner. The quantum dots 66 are selected according to the bandgap of the materials (e.g. InP) relative to the target wavelength of device operation according to very well-established methodology. Utilizing industry standard practices, the dots (quantum dot cores) are grown to a target size with a user selectable size distribution (size dispersion or dispersion) and the isolated quantum dots cores 72 are subjected to industry standard protocols for growing a suitable shell 74 of user selectable size and material (e.g. ZnSe) thereon the quantum dot core 72. Once isolated, the quantum dots 66 are subjected to industry standard practice for functionalizing the quantum dots 66 with suitable ligands 76. The solvated dots are then applied to the substrate plates 62 that have been rendered partially conducting and substantially transparent. Once applied optional ALD (atomic layer deposition) treatments can be applied as dictated by the particular target application. The interconnect structures are then applied to the substrate plates 62 and the device is assembled and connected to the appropriate driver circuitry.

In an alternate embodiment, the quantum dots 66 may be imbedded within a suitable dielectric material 70 (FIG. 5) such as $Al_2O_3$ deposited by atomic layer deposition (ALD) in order to further isolate and stabilize the electric charge on the individual quantum dots 66. In so doing, the quantum dot environment and subsequent polaron dynamics can be further optimized to enhance Auger scattering recombination lifetimes. Intra-dot Auger relaxation of bound carriers through scattering is directly affected by polaron dynamics where the effective mass of the electrons (liberated from the quantum dot by excitation) can extend the relaxation time of this scattering mechanism from less than 10 picoseconds to around 250 picoseconds, where this relaxation time scales with the electron's effective mass, which is modulated by quantum dot (core and shell) diameter.

In use, a control unit is operationally coupled to a substrate plate assembly 52 either by direct hard ware connection (the case of non-optical electromagnetic drive signals) or is optically coupled (in the case of optical electromagnetic drive signals) to provide an electromagnetic signal that excites the quantum dots 66. An incoming electromagnetic beam is directed into the substrate plate assembly 52 and the parameters of quantum dot size, ligand chemistry, quantum dot core diameter to shell diameter ratio, and plate spacing are adjusted (alone or in concert) to accomplish the desired switching speed or degree of electromagnetic beam steering. The degree of steering is additive, with each successive layer imparting additional wavefront deflection (steering) to reach the desired degree of steering. The individual layers are driven by the application of the control signal, which need not be the same, such that each successive layer may add different amounts of steering, without regard to the steering degree added in previous or subsequent layers.

Basically, the control unit signals create a proportional scanning signal based upon the change in permittivity realized as a function of the applied electrical, electromagnetic or optical signal. In the case of the electrical signal, the applied signal creates changes in the quantum dot electromagnetic environment at a rate commensurate with the switching frequency of the signal, which is between 0.02-

100 MHz in the preferred embodiment but could be as fast at 100 GHz. This alternating signal creates the variable scanning effect through a predetermined steering angle.

The novelty here, aside from the structure of the scanner, resides in the variability of the quantum dot electromagnetic environment which provides operator flexibility as to how the scanning of the incident laser beam is accomplished and to what degree. The magnitude of the steering angle through which the laser beam is scanned is proportional to the degree of wavefront modulation which is directly related the change in permittivity and permeability of the quantum dots. Simply stated, changing the electromagnetic environment of the substrate plate assembly (as detailed herein) and more specifically of the quantum dots thereon, enables laser beam steering accomplished at speeds heretofore unattainable.

This solid-state laser beam scanner 52 is capable of operating at speeds in the hundreds of meters/second, meaning the scanned laser beam 46 can traverse linearly between points at the extremes of the field of view at hundreds of meters/sec.

While certain features and aspects have been described with respect to exemplary embodiments, one skilled in the art will recognize that numerous modifications are possible. Consequently, although several exemplary embodiments are described above, it will be appreciated that the invention is intended to cover all modifications and equivalents within the scope of the following claims.

Embodiments are described herein, and illustrated in the drawings, in terms of functional blocks, units and/or modules. Those skilled in the art will appreciate that these blocks, units and/or modules can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

Consequently, in view of the wide variety of permutations to the embodiments described herein, this detailed description and accompanying material is intended to be illustrative only and should not be taken as limiting the scope of the inventive concept. What is claimed as the invention, therefore, is all such modifications as may come within the scope and spirit of the following claims and equivalents thereto.

What is claimed:

1. A micromachining device, comprising:
   a laser;
   a moveable stage;
   a microprocessor controller; and
   a solid-state laser beam scanner comprising a control unit and a variable frequency electromagnetic signal generator electrically coupled to a substrate plate assembly comprised of at least one of a substantially transparent and partially conductive substrate plate having at least one generally planar face thereon with a series of quantum dots affixed with said substantially transparent and partially conductive substrate plate, each of a quantum dot in said series of quantum dots being of an arbitrary size, and each said quantum dot possessing an inducible dipole moment, and each said quantum dot in electrical contact with said substantially transparent and partially conductive substrate plate;
   wherein said microprocessor controller is electrically connected to said moveable stage, said laser and said control unit; and
   wherein said control unit provides a signal to excite said series of quantum dots on said substantially transparent and partially conductive substrate plate assembly to affect the scanning and steering of a laser beam through said substantially transparent and partially conductive substrate plate assembly; and
   wherein each said quantum dot has a core and a shell affixed onto said core and at least one of a ligand affixed to said shell.

2. The micromachining device of claim 1 further comprising:
   at least one of a spacer, and
   wherein said substrate plate assembly has multiple said substantially transparent and partially conductive substrate plates arranged in parallel layers; and
   wherein at least one of said spacers resides between adjacent said substantially transparent and partially conductive substrate plates.

3. The micromachining device of claim 1 wherein said shell is selected from the group of compound semiconductors comprising InP, CdS, ZnSe, GaAs, InGaP, any compound semiconductor from the II-VI, III-V, I-VII vertical columns in the periodic table, and doped intrinsic semiconductors such as Si.

4. The micromachining device of claim 1 further comprising:
   at least one transparent conductive path on at least one of said substantially transparent and partially conductive substrate plates;
   wherein said wire is a wire bundle of smaller conductors connected to an interconnect header on at least one of said substantially transparent and partially conductive substrate plates, said smaller conductors comprising individual metallic traces providing electrical contact through metalized conductive vias to said transparent conductive path.

5. The micromachining device of claim 4 further comprising:
   a dielectric material between said substantially transparent and partially conductive substrate plates.

6. The micromachining device of claim 1 further comprising a focusing lens between said substantially transparent and partially conductive substrate plate assembly and said stage.

7. A micromachining device, comprising:
   a laser;
   a moveable stage;
   a controller;
   a solid-state laser beam scanner comprised of a control unit comprising a variable frequency electromagnetic signal generator coupled to an optical signal generator that is optically coupled to a substrate plate assembly comprised of at least one of a substantially transparent and partially conductive substrate plate having at least one generally planar face thereon with a series of quantum dots affixed with said substantially transparent and partially conductive substrate plate, each of a quantum dot in said series of quantum dots being of an arbitrary size, and each said quantum dot possessing an inducible dipole moment, and each said quantum dot in electrical contact with said substantially transparent and partially conductive substrate plate;

wherein said controller is electrically connected to said moveable stage, said laser and said control unit; and wherein said control unit provides an electromagnetic signal to said optical signal generator to initiate the transmission of an optical signal to said substantially transparent and partially conductive substrate plate assembly to excite said series of quantum dots on said substrate plate assembly to steer and scan a laser beam passed through said substrate plate assembly; and wherein said quantum dots have a core and a shell affixed onto said core and at least one of a ligand affixed to said shell.

8. The micromachining device of claim 7 further comprising at least one of a spacer, and wherein said substrate plate assembly has multiple said substantially transparent and partially conductive substrate plates arranged in a configuration of parallel layers; and wherein said spacer resides between adjacent said substantially transparent and partially conductive substrate plates.

9. The micromachining device of claim 8 wherein said shell is selected from the group of compound semiconductors comprising InP, CdS, ZnSe, GaAs, InGaP, any compound semiconductor from the II-VI, III-V, I-VII vertical columns in the periodic table, and doped intrinsic semiconductors such as Si.

10. The micromachining device of claim 9 further comprising:
a dielectric material between said substantially transparent and partially conductive substrate plates.

11. The micromachining device of claim 10 further comprising a focusing lens between said substantially transparent and partially conductive substrate plate assembly and said stage.

* * * * *